(12) United States Patent
Jöngren et al.

(10) Patent No.: US 8,401,485 B2
(45) Date of Patent: Mar. 19, 2013

(54) CALIBRATION METHOD AND DEVICE IN TELECOMMUNICATION SYSTEM

(75) Inventors: George Jöngren, Stockholm (SE); David Astely, Bromma (SE); Bo Göransson, Sollentuna (SE); Jonas B. Karlsson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 365 days.

(21) Appl. No.: 12/522,794

(22) PCT Filed: Feb. 6, 2008

(86) PCT No.: PCT/SE2008/050148
§ 371 (c)(1),
(2), (4) Date: Jul. 10, 2009

(87) PCT Pub. No.: WO2008/097187
PCT Pub. Date: Aug. 14, 2008

(65) Prior Publication Data
US 2010/0099362 A1   Apr. 22, 2010

(30) Foreign Application Priority Data
Feb. 6, 2007   (SE) ................................. 0700301

(51) Int. Cl.
*H04B 17/00* (2006.01)
(52) U.S. Cl. ................. 455/67.11; 455/504; 455/65
(58) Field of Classification Search ............. 455/504, 455/505, 506, 65, 66.1, 67.11, 67.14, 69, 455/703, 550.1
See application file for complete search history.

(56) References Cited

U.S. PATENT DOCUMENTS

| 7,079,868 | B2 | 7/2006 | Guo |
| 7,929,994 | B2* | 4/2011 | Kishigami et al. ............ 455/561 |
| 2002/0065047 | A1* | 5/2002 | Moose ............................ 455/63 |
| 2004/0235512 | A1 | 11/2004 | Kiiski et al. |
| 2006/0270360 | A1* | 11/2006 | Han et al. ........................ 455/69 |

FOREIGN PATENT DOCUMENTS

| JP | 06-303172 | 10/1994 |
| JP | 2001-102976 | 4/2001 |
| WO | 02082689 A2 | 10/2002 |
| WO | WO 2005/036771 A1 * | 4/2005 |
| WO | 2007055972 A2 | 5/2007 |

OTHER PUBLICATIONS

International Search Report for PCT/SE2008/050148 mailed Jul. 24, 2008.
International Preliminary Report on Patentability for PCT/SE2008/050148 mailed Jun. 9, 2009.
Japanese Office Action in corresponding Japanese Application No. 2009-548205 dated Oct. 26, 2012.

* cited by examiner

*Primary Examiner* — Ping Hsieh
(74) *Attorney, Agent, or Firm* — Potomac Patent Group PLLC (57) ABSTRACT

A device system, computer medium and method for calibrating at least one impairment of a signal transmitted from a transmitting unit to a receiving unit, the method including receiving at the receiving unit at least two signals transmitted from the transmitting unit, estimating at the receiving unit, based on the received at least two signals, at least one parameter associated with transmit chain links between the transmitting unit and corresponding antennas of the transmitting unit, collecting the at least one parameter in a measurement report at the receiving unit, and transmitting the measurement report from the receiving unit for correcting the at least one impairment based on the at least one parameter.

18 Claims, 7 Drawing Sheets

FIG. 1

FREQUENCY

CALIBRATION METHOD AND DEVICE IN TELECOMMUNICATION SYSTEM

RELATED APPLICATION

This application is related to, and claims priority from, Swedish Patent Application Serial No. SE 0700301-5, filed on Feb. 6, 2007, entitled "Method and Arrangement in a Telecommunication System" to Jöngren et al., the entire disclosure of which is incorporated here by reference.

TECHNICAL FIELD

The present invention generally relates to radio communication systems, devices, systems, software and methods and, more particularly, to mechanisms and techniques for calibration procedures for channel parts of the radio communication systems.

BACKGROUND

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e. the transmission direction from the mobile terminal to the network) using single carrier frequency division multiple access (FDMA).

Figure 1:
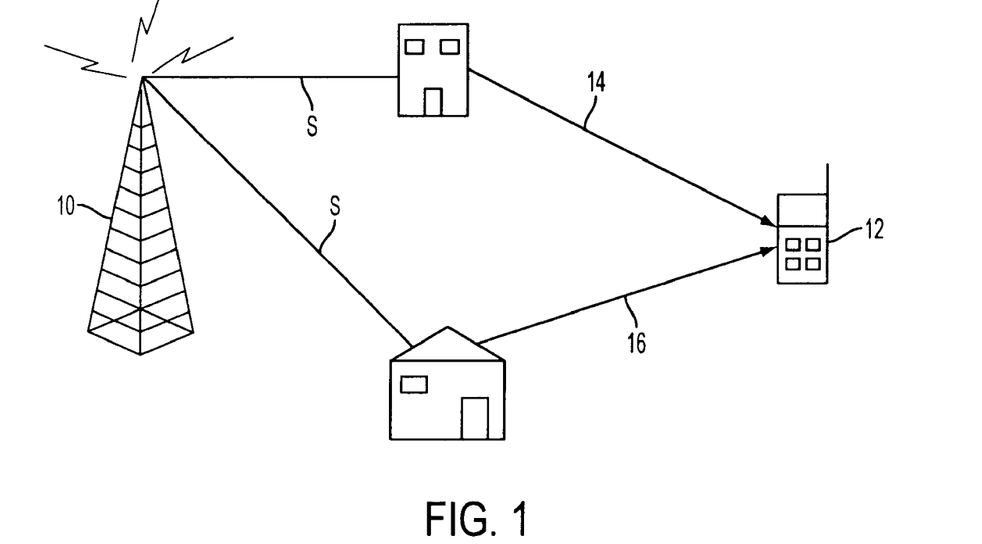
FIG. 1 is a schematic diagram showing a signal propagating from a base station via multiple paths to a user terminal.
Figure 2:
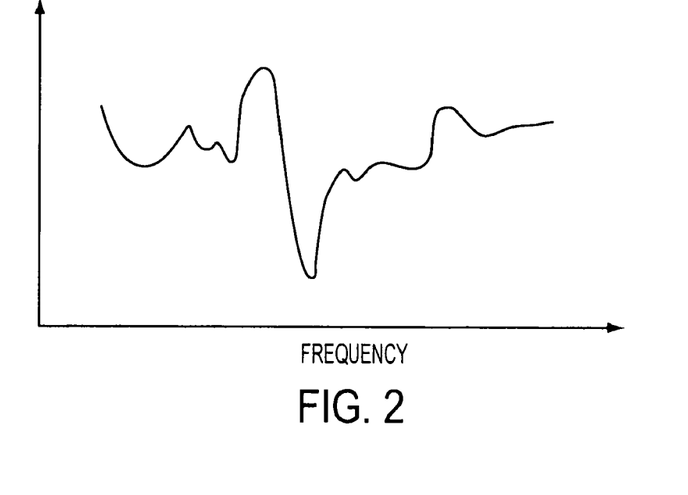
FIG. 2 is a schematic diagram showing frequency-selectivity of a communication channel.

Modern wireless communication systems targeted for packet-based communications often include multiple-input-multiple-output (MIMO) antenna array configurations. The use of multiple antennas at the transmitter and/or the receiver side can significantly boost the performance of a wireless system. Such MIMO arrays of antennas have the potential of both improving data rates as well as increasing the diversity. The antennas in a MIMO configuration can be located relatively far from each other, typically implying a relatively low mutual correlation. Alternatively, the antennas can be located relatively close to each other, typically implying a high mutual correlation. Which correlation is desirable depends on what is to be achieved with the multi-antenna configuration. i.e., diversity, beamforming, or spatial multiplexing. The MIMO antenna configurations have multiple radio channels that are subject to some degree of frequency selectivity, implying that the channel quality will vary in the frequency domain. The frequency diversity increases a corruption of a transmitted signal in wider-band transmission. In this respect, time dispersion occurs when the transmitted signal propagates to the receiver via multiple paths with different delays as shown for example in FIG. 1, in which a signal S propagates from a node 10 to a user terminal 12 via two paths 14 and 16. The user terminal may be any device that is capable to communicate wireless with the base station. For example, the user terminal may be a mobile phone. In the frequency domain, a time-dispersive channel corresponds to a non-constant channel frequency response as shown in FIG. 2. The radio-channel frequency selectivity corrupts the frequency-domain structure of the transmitted signal and leads to higher error rates for given signal-to-noise/interference ratios. Each radio channel in the MIMO configuration is subject to frequency selectivity, at least to some extent. The extent to which the frequency selectivity impacts the radio communication depends on the bandwidth of the transmitted signal. It also depends on the environment.

Frequency-selectivity may not only be due to the propagation conditions. The radio frequency (RF) chains, including transmit filters, antenna cables and antennas at the base station, are likely to also contribute to the overall frequency variations of the channel unless specific measures are taken to mitigate this kind of impairment by some form of calibration. One type of impairment in this category is time misalignment among the signals received at the user terminal from different antennas of the base station equipped with MIMO antennas. Even a small time difference of the received signals can have a large impact on the effective channel response since a substantial phase difference, linear in frequency, is induced by the time misalignment.

To illustrate the impact of time-misalignment, consider the requirements in wideband code division multiple access (WCDMA), which stipulate that the time difference between the two antennas must be less than 65 ns. Then, the relative phase difference between the two antennas would be on the order of 470 degrees ($360 \times 65 \times 1e^{-9} \times 20e^{6}$) for a 20 MHz system. Assuming a three-bit codebook of discrete Fourier transform (DFT) based beamforming vectors, the phase shift between two consecutive beamforming vectors is 45 degrees. This frequency-selectivity would thus alone force the use of roughly 470/45=10 beamforming elements across the bandwidth in order to limit the losses due to ill-matched beamforming elements. As would be discussed later, this would increase the signaling overhead. Thus, the frequency selectivity should be corrected. Prior to discussing existing methods for correcting frequency selectivity. WCDMA and LTE frequency selectivity is discussed next.

Figure 3:
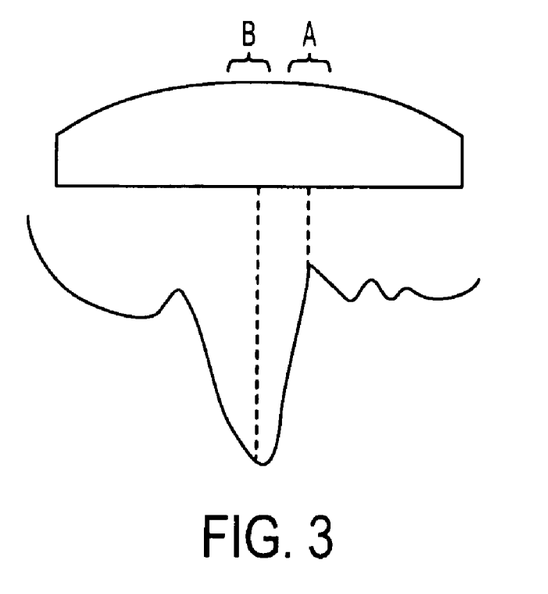
FIG. 3 is a schematic diagram showing the frequency-selectivity for a single carrier.

In case of a single wideband carrier, such as a WCDMA carrier, each modulation signal is transmitted over the entire signal bandwidth. Thus, in case of the transmission of a single wideband carrier over a high frequency-selective channel as shown in FIG. 3, each modulation symbol will be transmitted both over frequency bands with relatively high quality (A) and frequency bands with low quality (B). Such transmission of information over multiple frequency bands with different instantaneous channel quality is also referred to as frequency diversity. Frequency diversity is desirable in order to improve the quality of the received signal. Thus, the WCDMA system has a good error-rate performance over a frequency-selective channel by its structure.

Figure 4:
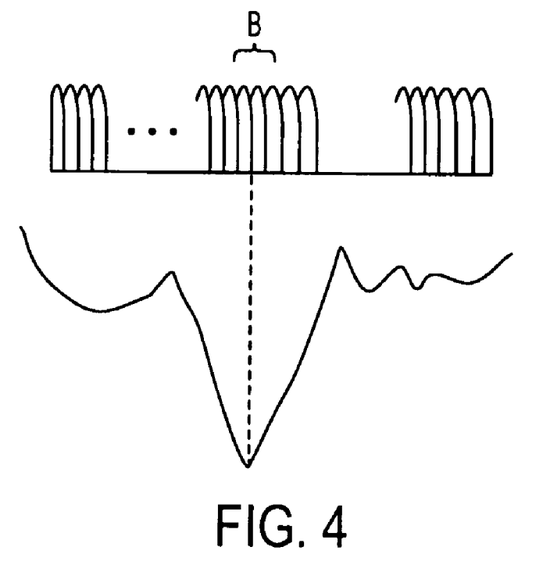
FIG. 4 is a schematic diagram showing the frequency-selectivity for a OFDM configuration.

On the contrary, in case of OFDM transmission that is used in LTE systems, each modulation symbol is confined to a relatively narrow bandwidth and thus, certain modulation symbols may be fully confined to a frequency band with low instantaneous signal strength B, as illustrated in FIG. 4. Thus, the individual modulation symbols will typically not experience any substantial frequency diversity even if the channel is highly frequency selective over the overall OFDM transmission bandwidth. As a consequence, the basic error-rate performance of OFDM transmission over a frequency-selective channel is poorer than the basic error rate in case of a single wide band carrier.

One way to guard against deficiencies (e.g., frequency diversity) in the channel and to improve error rate performance is to premultiply, at the transmitting unit, the transmission data streams by a precoding matrix, chosen based on channel information. This precoding technique improves the performance of a MIMO system by transforming the information carrying transmit vector so that it better fits the channel conditions. Precoding can been used based on knowledge of the full channel state information of the transmitting unit. The precoding can be performed based on instantaneous channel information, without channel information, or some combination thereof. The precoding may be implemented by performing a linear transformation on the information carrying vector prior to transmission. Such a linear transformation is usually represented by a matrix. Precoding is used as part of WCDMA and is likely to be a part of LTE as well.

There are two basic forms of precoding presently used in telecommunication systems, codebook based and non-codebook based. Codebook based precoding implies that the precoding matrix implementing the linear transformation is selected from a countable and typically finite set of candidate matrices. The transmit precoder is chosen by the receiver from a codebook of precoding matrices known to both the receiver and the transmitter. The mentioned set constitutes the codebook. Channel dependent codebook based precoding is similar to channel quantization because a set of channel realizations map to a certain precoding element. Non-codebook based precoding, on the other hand, does not involve any quantization, and the precoding element can thus, for example, be a continuous function of the channel matrix. A special case of precoding is beamforming. In beamforming, a single information carrying symbol stream is multiplied by a channel dependent vector, which adjusts the phase of the signal on each transmit antenna, so that coherent addition of the transmit signals can be obtained at the receiver side. The beamforming method provides diversity as well as increases the SNR.

The precoder element to be used for the transmission of data to the user terminal may need to be signaled, by way of feedback signaling and/or signaling of the chosen precoder element in forward link, i.e., in a direction from a base station to the user terminal. The term "base station" is used in this disclosure as a generic term for the "NodeB" of the WCDMA system, the "eNodeB" of the LTE system, and other nodes of other systems as will be appreciated by those skilled in the art. The feedback signaling is one way for the receiver to provide channel information to the transmitter.

Several different approaches are known for forward link signaling associated with precoding. One approach is explicitly signaling the precoder element index in forward link. Another approach is implicitly signaling the precoder element index using precoded reference symbols/pilots, which together with non-precoded reference symbols can be used at the receiver side to determine the used precoder element. Still another approach is to use precoded reference symbols also for the demodulation of the data, so-called dedicated reference symbols, and to incorporate, from the receiver's point of view, the precoder element into the effective channel. For maximum performance, the precoding element may be chosen to match the effective channel, including transmit and receive filters, channel responses of antenna cables, and the actual propagation channel. If the effective channel varies, as discussed above with regard to the frequency selectivity, over the bandwidth allocated to communication, it is preferable to adapt the precoding over frequency as well, in order to obtain a better match with the frequency-selective channel. However, this process affects the signaling of the precoder elements and a finer frequency granularity of the feedback and forward link signaling may be needed. If dedicated reference symbols are used for the process of matching the precoding element with the effective channel, it results in a reduced coherence bandwidth of the effective channel, which means that the channel estimation procedures at the receiver side may have less data to average over and thus, negatively affects the estimation accuracy. Therefore, channel-dependent precoding has the potential of providing performance gains i.e., correcting the frequency selectivity, and it is the preferred precoding to correct the corruption of transmitted signals. However, the precoding requires certain conditions to be satisfied, as discussed next.

Achieving the gains of the channel-dependent precoding relies on, for example, the ability of the precoder element to closely match the effective transmission channel. Because the effective channels are frequency-selective, traditional telecommunication devices and systems require a calibration process to constantly be performed by the base station since the used precoder element needs to track the channel as the channel varies over the frequency. The propagation part of the effective channel is time-varying and can be challenging to compensate for without incurring additional signaling overhead, which is undesirable. Also, differences in cable lengths over which signals can be conveyed, e.g., between nodes within the fixed parts of the network, imply that the transmitted signals from the antennas may not be time-aligned. In addition, the transmit filters provided in base stations transmit chains may be frequency-selective and moreover, may have different properties depending upon a connection between a particular filter and an antenna connected to the filter. All these factors increase the variations over frequency of the effective channel and thus, contribute to the previously mentioned problems in the traditional communication systems.

It is one object of the next exemplary embodiments to overcome these and other problems with respect to communication systems.

SUMMARY

According to an exemplary embodiment, a method for calibrating at least one impairment of a signal transmitted from a transmitting unit to a receiving unit, includes; receiving at the receiving unit at least two signals transmitted from the transmitting unit; estimating at the receiving unit, based on the received at least two signals, at least one parameter associated with transmit chain links between the transmitting unit and corresponding antennas of the transmitting unit; collecting the at least one parameter in a measurement report at the receiving unit; and transmitting the measurement report from the receiving unit for correcting the at least one impairment based on the at least one parameter.

According to another exemplary embodiment, a receiving unit supplies data to a transmitting unit for calibrating at least one impairment of a signal transmitted from the transmitting unit to the receiving unit. The receiving and transmitting units are connected to a radio telecommunication network, the network including one or more user equipment units connected to one or more radio base stations, the user equipment units and radio base stations including the receiving unit and the transmitting unit. The receiving unit includes an antenna configured to receive at least two signals transmitted from the transmitting unit; a processor configured to estimate, based on the received at least two signals, at least one parameter indicative of transmit chain links; and the processor is configured to collect the at least one parameter in a measurement report and transmit the measurement report to the antenna to be transmitted from the receiving unit for correcting, based on the at least one parameter, the at least one impairment.

According to still another exemplary embodiment, a radio telecommunication network is configured to calibrate at least one impairment of a signal transmitted from a transmitting unit to a receiving unit. The network includes at least one user terminal that includes the receiving unit, at least one radio base station electromagnetically connected to the at least one user terminal, the at least one radio base station including the transmitting unit, and the transmitting unit including transmit chain links between components of the transmitting unit and antennas of the transmitting unit. The receiving unit is configured to receive at least two signals transmitted from the transmitting unit, estimate, based on the received at least two signals, at least one parameter indicative of the transmit chain links of the transmitting unit, collect the at least one parameter in a measurement report, and transmit the measurement report to the transmitting unit for correcting the at least one impairment based on the at least one parameter.

According to another exemplary embodiment, a computer readable medium includes computer executable instructions, where the instructions, when executed by a processor that is part of a receiving unit or a transmitting unit, cause the processor to perform a method for calibrating at least one impairment of a signal transmitted from the transmitting unit to the receiving unit. The method includes receiving at the receiving unit at least two signals transmitted from the transmitting unit; estimating at the receiving unit, based on the received at least two signals, at least one parameter indicative of transmit chain links; collecting the at least one parameter in a measurement report at the receiving unit; and transmitting the measurement report from the receiving unit for correcting the at least one impairment based on the at least one parameter.

According to another exemplary embodiment, a receiving unit supplies data to a transmitting unit for calibrating at least one impairment of a signal transmitted from the transmitting unit to the receiving unit, the receiving and transmitting units being connected to a radio telecommunication network, the network including one or more user equipment units connected to one or more radio base stations, the user equipment units and radio base stations including the receiving unit and the transmitting unit. The receiving unit includes means for receiving at least two signals transmitted from the transmitting unit; means for estimating, based on the received at least two signals, at least one parameter indicative of transmit chain links between the transmitting unit and corresponding antennas of the transmitting unit; and the means for estimating also collecting the at least one parameter in a measurement report and transmitting the measurement report to means for receiving to be transmitted from the receiving unit to the transmitting unit for correcting, based on the at least one parameter, the at least one impairment.

According to another exemplary embodiment, there is a device for calibrating at least one impairment based on received data from a receiving unit, the receiving unit and the device being connected to a radio telecommunication network, the network including one or more user equipment units connected to one or more radio base stations, the user equipment units and radio base stations including the receiving unit and the device. The device includes an antenna array configured to send at least two signals to the receiving unit and receive a measurement report from the receiving unit that includes at least one parameter measured by the receiving unit based on the at least two signals, the at least one parameter being indicative of transmit chain links of the device; and a control unit connected to the antenna array and configured to correct, based on the received at least one parameter, the at least one impairment.

BRIEF DESCRIPTION OF THE DRAWINGS

A more complete understanding of the exemplary embodiments may be gained by reference to the following 'Detailed description' when taken in conjunction with the accompanying drawings. The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 5:
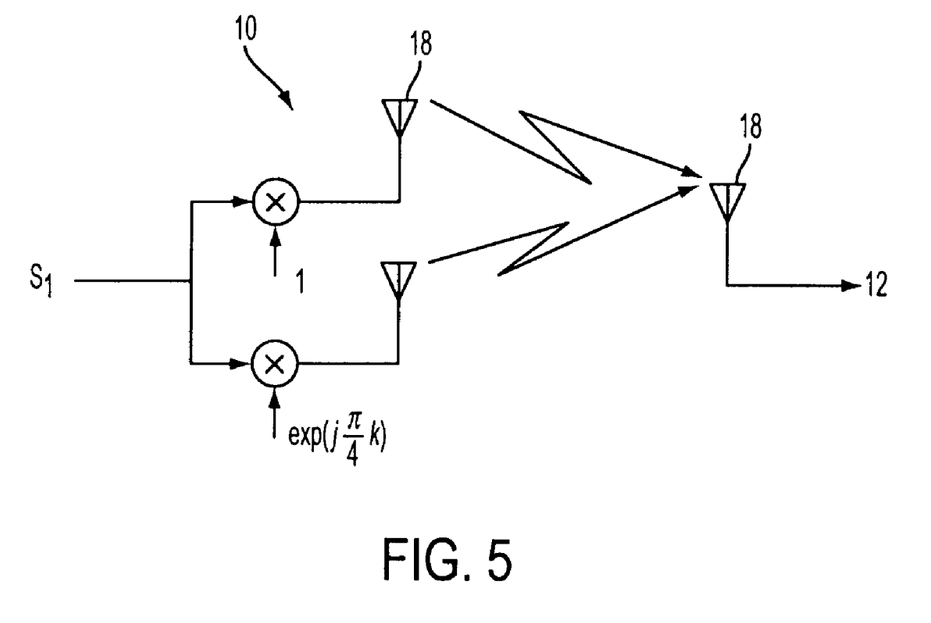
FIG. 5 is a schematic diagram showing an example of beamforming for two transmit antennas of a base station and one receive antenna of a user terminal.

The following exemplary embodiments are described in the context of an LTE system. However, the general principles and methods of the exemplary embodiments are also applicable to other communication systems, e.g., WCDMA, CDMA, WiMax, etc. as will be appreciated by those skilled in the art. In an exemplary embodiment illustrated in FIG. 5, it is assumed that the base station 10 includes a transmitting unit and the user terminal 12 includes a receiving unit. Nevertheless, in another exemplary embodiment, the roles of the base station 10 and the user terminal 12 may be reversed, e.g., for the calibration of the user terminal measurements at the base station which are transmitted to the user terminal.

As discussed above, the channel-dependent precoding relies on the ability of the system to use a precoder element to closely match the channels, even when the effective channels are frequency-selective. For codebook-based precoding, this process may imply a higher signaling overhead, since the appropriate precoder elements need to be signaled from the receiver to the transmitter and/or signaled from the transmitter to the receiver. The amount of dedicated reference symbols (RS) needed may increase, thus also contributing to higher signaling overhead. If the signaling overhead is kept constant in one embodiment, then the degree of mobility at which efficient support of precoding can be achieved may become limited. Consequently, the precoding needs to be carried out with smaller frequency granularity resulting in higher overhead to obtain the same performance. In another embodiment, if the precoding is performed with fixed overhead, then the system is able to support precoding at lower user terminal speeds. In another embodiment in which non-codebook based precoding is performed, increased frequency selectivity incurs additional overhead.

Figure 6:
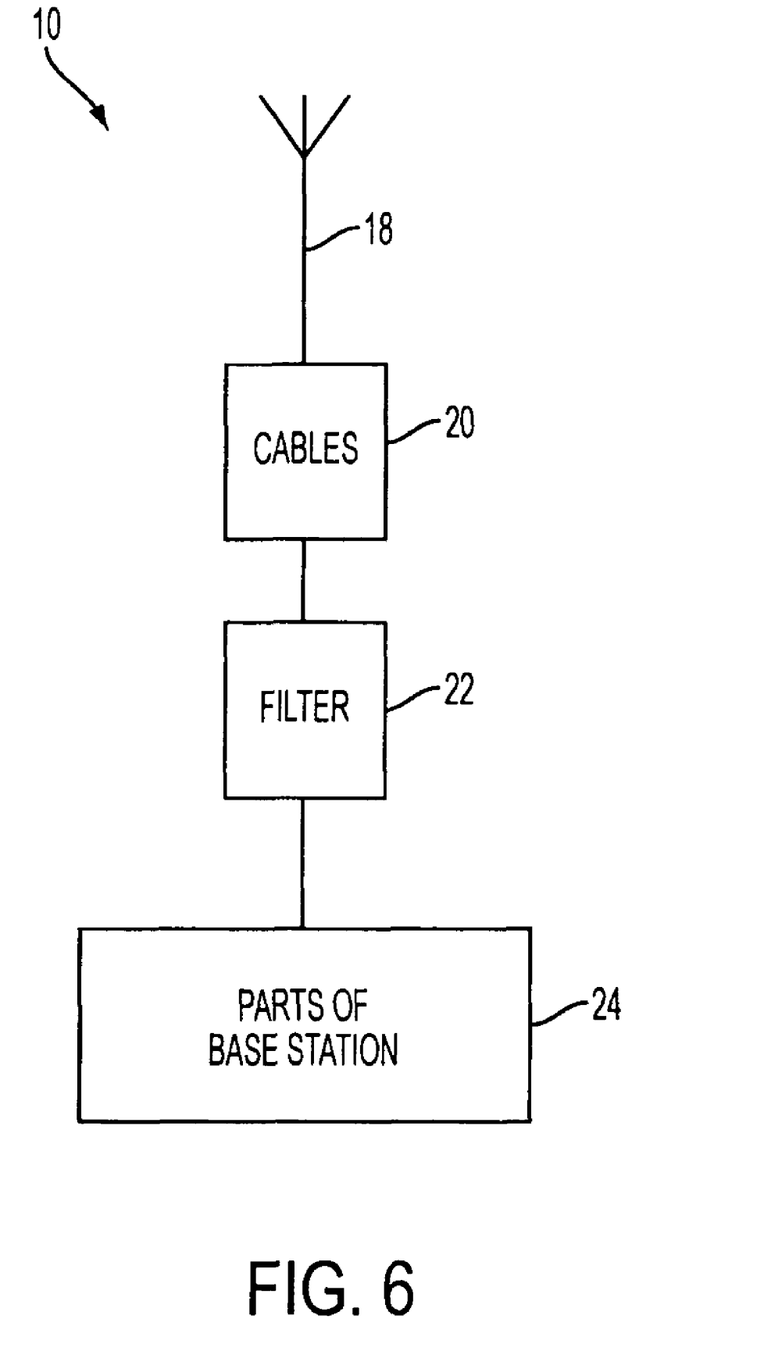
FIG. 6 is a schematic diagram showing an antenna connected to a base station via various components.

According to an exemplary embodiment, the propagation part of the effective channel is time-varying and it may be difficult to compensate for this time variation without incurring additional signaling overhead. Other parts of the effective channel are relatively constant over time. In one embodiment, as shown in FIG. 6, frequency-selectivity may be introduced by the radio transmit chain links at the base station. The transmit chain links may include, according to one exemplary embodiment, cables 20 and transmit filters 22 connecting the antennas 18 to the remaining of the base station 24. In another embodiment, the transmit chain links include the antennas and other parts of the base station as will be appreciated by those skilled in the art. Differences in cable 20 lengths result in the signals transmitted from the antennas to not be time-aligned. The transmit filters 22 may be frequency-selective and moreover, have different properties depending on a connection between a transmit filter and a corresponding antenna. These two elements increase the variations over frequency of the effective channel and thus, contribute to the previously mentioned problems of the conventional communication systems. Such uncalibrated transmit chain links may, in conjunction with codebook based precoding, introduce additional losses due to the individual precoder elements being ill-matched to the channel. This and other impairments related to filter coefficients and phase uncertainty are corrected in the following exemplary embodiments.

To overcome these impairments of the conventional communication systems, according to an exemplary embodiment, an antenna array calibration is performed as will be described next. Conventional ways of mitigating the calibration problem include designing and building transmit radio chains with smaller tolerances and more careful tuning of the corresponding filters. This approach is expensive and besides, a manufacturer may not have complete control of the whole transmit radio chain to ensure that all antenna cables have equal lengths. Another approach is equipping the base station with a receiver specifically designed for calibration purposes and connecting the receiver to the base station. This approach requires extra hardware, is complicated and makes it difficult to achieve calibration targeting a certain physical direction. Also, this approach is difficult when attempting to calibrate the transmit chain of the user terminal. Still another approach is to calibrate the transmission of the base station based on the precoder and/or a channel quality indicator (CQI) feedback from the user terminal. This method may have problems with the estimation accuracy, since the base station has rather limited channel knowledge as input to the calibration. The efficiency of this last method relies also on the exact precoding codebook used and the chosen CQI reporting scheme. This can be a drawback if a certain CQI and precoding scheme is preferable due to other reasons and cannot fulfill the estimation accuracy needed for successful calibration.

According to an exemplary embodiment, an antenna array calibration method to be used in wireless systems and corresponding arrangements estimates parameters that are needed for the transmit chain links and antenna calibration. The estimating may be performed at the receiver unit. The method also includes collecting the estimation results in a measurement report, which can be signaled to the transmitting unit, and using, at the transmitting unit, the measurement report when deciding how to compensate for the impairments. According to another embodiment, plural user terminals perform corresponding estimations and the transmitting unit receives, from all or many of the receiving units, their estimations to decide the calibration. The transmitting unit may decide the calibration based on an average of the received estimations from the plural receiving units.

Figure 7:
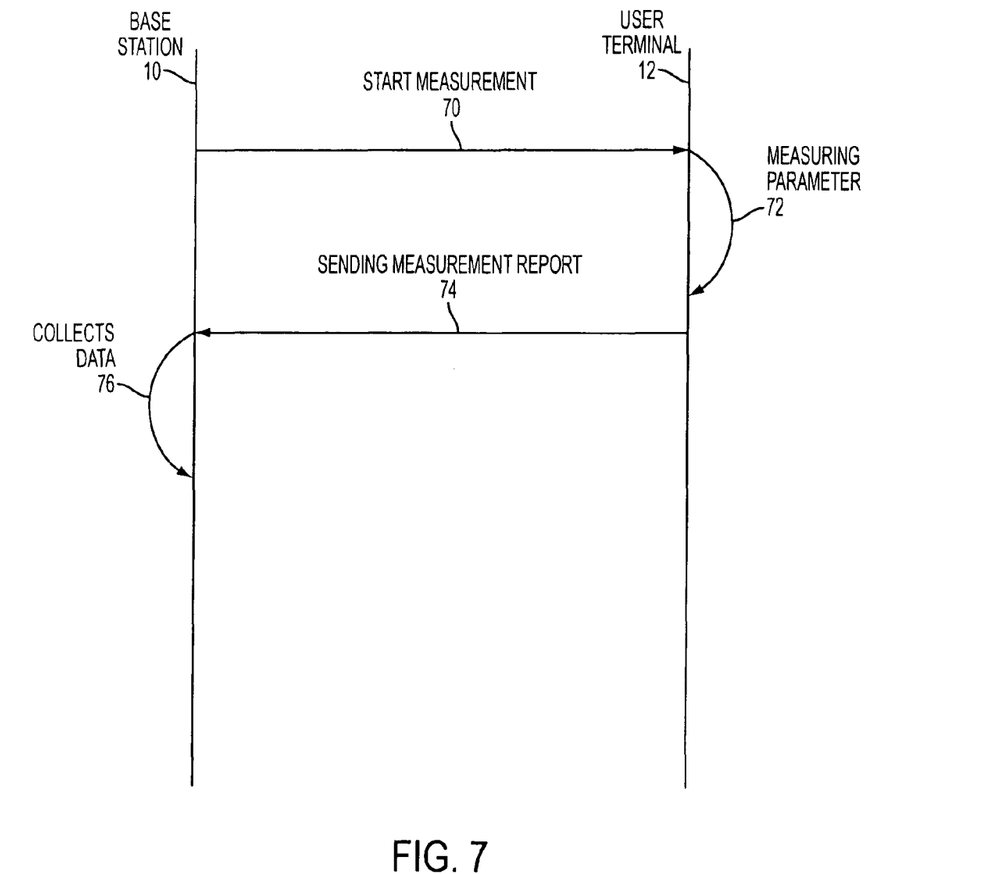
FIG. 7 is a schematic diagram showing steps for estimating specific parameters at a base station.

More specifically, as shown in one embodiment illustrated in FIG. 7, the base station 10 signals in step 70 the user terminal 12 to start measuring calibration-related parameters. During a predetermined time interval, the user terminal measures in step 72 the required parameters. The details of the measurement are discussed later. After the user terminals have acquired the measured parameters, the user terminals transmit to the base station, in step 74, a measurement report including the estimates. The calibration specific parameters may include time differences or phase shifts. Other parameters are also possible and depend on the specific impairment that is desired to be corrected. According to one embodiment, these parameters change slowly in time (for example, because of the temperature, and thus the parameters change is slow compared to symbol or slot timing) so the signaling in forward (from the base station to the user terminal) as well as in reverse (from the user terminal to the base station) link can be conducted on a slow basis (for example several second or less in one exemplary embodiment), using for example, a higher layer signaling. In step 76, the base station collects the measurement report from the user terminal 12 or multiple user terminals and uses those reports to calculate its own estimate of calibration specific parameters. Based on the calculated calibration specific parameters, the base station calibrates its transmission. In other words, the base station does not measure specific calibration parameters but calculates/estimates these parameters based on the measurements performed and transmitted from one or more user terminals.

In the following exemplary embodiment, the determination of one specific (but purely illustrative) calibration parameter is discussed in detail. Other specific calibration parameters may be determined in a similar manner to this one specific yet exemplary parameter. Thus, for simplicity, only the determination of the one specific calibration parameter is discussed. The one specific calibration parameter is the time delay of at least two signals received at the receiving unit. In one exemplary embodiment, the method may be applied to any wideband system, for example multi-carrier systems such as OFDM. The user terminal estimates the effective channel as a function of frequency over some bandwidth. Suppose that the phase of the channel estimate from a transmit antenna k to a receive antenna l is denoted by $\Theta_{kl}(f)$. The transmit antenna k is at the transmitter unit and the receive antenna l is at the receiver unit. k can take any value from 2 to "n" and/can take any value between 1 and "n," where n is a positive integer. The phase of the received signal at the receiving unit can be written as:

$$\Theta_{kl}(f) = \phi_{h,kl}(f) + \Delta_k f,$$

where the first term represents a phase variation due to the propagation channel and receive filters at the receiver unit, and $\Delta_k$ is the time difference induced by cables and transmit filters at the transmitting unit. The user terminal may estimate the time difference $\Delta_k - \Delta_{k'}$ of the signals from transmit antennas k and k' by forming the difference $$\Theta_{kl}(f) - \Theta_{k'l}(f) = \phi_{h,kl}(f) - \phi_{h,k'l}(f) + (\Delta_k - \Delta_{k'})f$$

and then fitting a line to this data, possibly taking the modulo $2\pi$ arithmetic into account, i.e., because one lap around the unit circle is $2\pi$, this may be taken into account when multiple laps around the unit circle are taking place.

Figure 8:
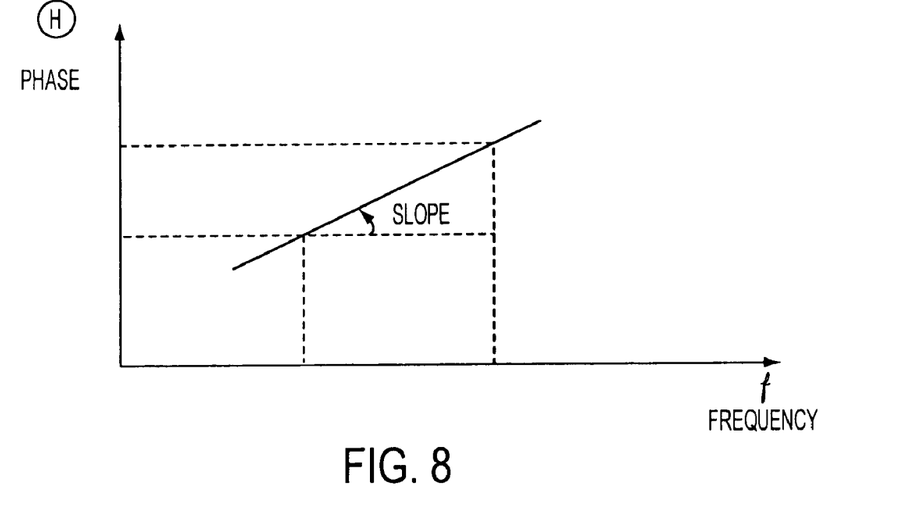
FIG. 8 shows a slope of a phase versus frequency graph.

The slope of the fitted line is shown in FIG. 8 and is, according to an exemplary embodiment, an estimate of the time difference of the signals received by the same receiving unit from different antennas of the same transmitting unit. By forming the above noted phase difference, the phase variation term introduced by the filters and other components at the receiving units can be isolated such that the phase variation term introduced by the transmitting unit can be calculated. This process can be repeated one or several more times and then the results averaged over time to improve the estimate performed by the receiving unit. After signaling the time difference $\Delta_k - \Delta_{k'}$ (or another equivalent parameter that allows to calculate the phase difference of the signals) to the transmitting unit, the transmitting unit forms an estimate of the time difference. The transmitting unit may, according to one embodiment, combine into one average estimate several time differences received from plural receiver units. Based on the estimated time difference, the base station compensates for the time difference by de-rotating the phase of the transmitted signals in the frequency domain. Shifting in the time domain is also possible according to one exemplary embodiment.

In one exemplary embodiment, if precoding with dedicated pilots is performed, certain phase shifts across the antenna array are applied to focus the transmitted power to a specific user terminal. This means that an additional term (different for different users) is present in the phase. The presence of this term makes it more difficult for the base station to use information from different users to form an estimate of, for example, the time delay in the cables. While it is possible for the base station to "remember" what phase shifts were applied during the time the user terminal measured the channel, and then compensate for this in the calculation, this approach adds to the complexity of the system. An alternative approach is to apply weights during the measurement time or a specific weight vector (or matrix) during the measurement time. If this is the same for all users, no (or very simple) compensation is needed in the network.

According to one exemplary embodiment, a method for calibrating for other fixed impairments, e.g., transmit filters, filter coefficients and phase uncertainty, is to perform averaging over the fast channel fading. What remain of the effective channel after such averaging is the long-term channel properties and the fixed channel parts. Since the long-term properties of the channel are rather frequency non-selective, according to one exemplary embodiment the fixed parts of the channel are identified and the signal transmitted from the base station is compensated.

Figure 9:
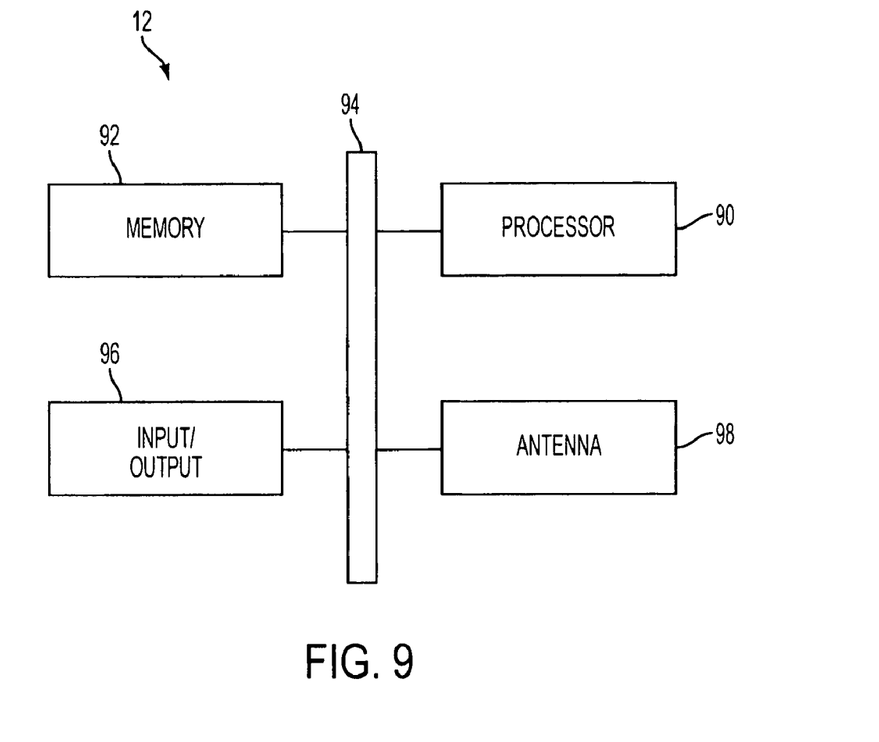
FIG. 9 is a schematic diagram of a user terminal or a base station.

According to an exemplary embodiment, the process described in FIG. 9 can be implemented in a user terminal that includes a processor 90 connected to a memory 92 via a bus 94. The processor 90 may be configured to act as a receiver, a transmitter, to read data (time differences for example) from the memory 92 and to calculate estimates of the time differences. The processor 90 may also be configured to perform any necessary calculation, averaging, coding, precoding and other operations that are performed in a user terminal or a base station as will be appreciated by those skilled in the art. The data may be input via an input/output unit 96 also connected to the bus 94 or via an antenna 98. The antenna 98 may include one antenna or a plurality of antennas that form the MIMO configuration. The structure of the user terminal 12 shown in FIG. 9 can be used for the base station 10. Other equivalents of the processor, memory, input/output and antennas may be used as would be appreciated by those skilled in the art. In addition, the structure shown in FIG. 9 can be used in a transmitting unit or a receiver unit with additional components known by those skilled in the art.

Figure 10:
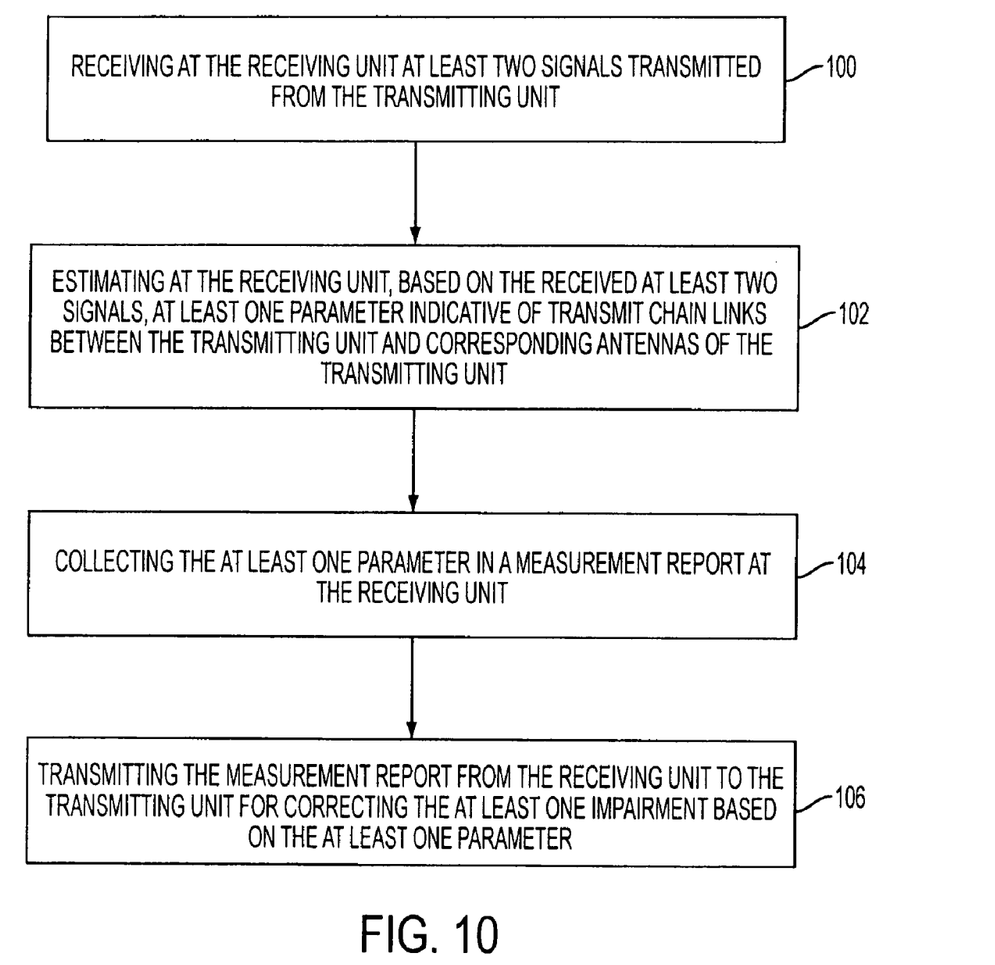
FIG. 10 is a flow chart illustrating steps performed according to a method for calibrating the communication system.

FIG. 10 shows steps of a method for calibrating at least one impairment of a signal transmitted from a transmitting unit to a receiving unit. The method includes, receiving in step 100, at the receiving unit, at least two signals transmitted from the transmitting unit, estimating in step 102, at the receiving unit, based on the received at least two signals, at least one parameter indicative of transmit chain links between the transmitting unit and corresponding antennas of the transmitting unit, collecting in step 104 the at least one parameter in a measurement report at the receiving unit, and transmitting in step 106 the measurement report from the receiving unit to the transmitting unit for correcting the at least one impairment based on the at least one parameter.

These exemplary embodiments provide a device, system, a method and a computer program product for estimating a specific parameter in a communication system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a device, system, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

What is claimed is:

1. A method for calibrating at least one impairment of a signal transmitted from a transmitting unit, the method comprising:
receiving at a receiving unit at least two calibrating signals substantially simultaneously transmitted from the transmitting unit via two different transmit chain links of the transmitting unit, wherein each transmitting chain link includes at least a separate antenna and transmits a respective one of the two calibrating signals;
estimating, at the receiving unit, based on the received at least two signals, at least one parameter associated with the two different transmit chain links of the transmitting unit, wherein the estimating further comprises repeatedly measuring a phase difference of the at least two signals over a predetermined time interval and determining a slope of measured phase differences when represented versus a frequency corresponding to the at least two signals, and assigning to the at least one parameter a value of the determined slope;
collecting the at least one parameter in a measurement report at the receiving unit; and
transmitting the measurement report from the receiving unit for correcting the at least one impairment related to the transmit chain links, based on the at least one parameter.

2. The method of claim 1, further comprising:
transmitting the at least two signals from two different antennas of the transmitting unit and
transmitting the measurement report from the receiving unit to the transmitting unit.

3. The method of claim 1, wherein the estimating step further comprises:
repeatedly estimating the at least one parameter over an interval of time.

4. The method of claim 3, further comprising:
averaging the repeatedly estimated at least one parameter to determine an average parameter.

5. The method of claim 1, further comprising:
transmitting plural measurement reports from plural user terminals, each user terminal including a corresponding receiving unit.

6. The method of claim 5, further comprising:
averaging the plural measurement reports to determine an average value of the at least one parameter to be used for calibrating the transmit chain links.

7. The method of claim 1, further comprising:
calibrating a phase of one or both of the at least two signals based on the estimated at least one parameter.

8. The method of claim 1, wherein the at least one impairment is one of a time misalignment, filter coefficients, phase uncertainty.

9. The method of claim 1, wherein the transmit chain links include components of the transmitting unit and corresponding antennas.

10. The method of claim 1, wherein the transmitting unit is part of a base station.

11. The method of claim 1, wherein the receiving unit is part of a mobile phone.

12. A receiving unit for supplying data to a transmitting unit for calibrating at least one impairment of a signal transmitted from the transmitting unit to the receiving unit, the receiving and transmitting units being connected to a radio telecommunication network, the network including one or more user equipment units connected to one or more radio base stations, the user equipment units and radio base stations including the receiving unit and the transmitting unit, the receiving unit comprising:
an antenna configured to receive at least two calibrating signals transmitted substantially simultaneously from the transmitting unit via two different transmit chain links, wherein each transmitting chain link includes at least a separate antenna and transmits a respective one of the two calibrating signals;
a processor configured to estimate, based on the received at least two signals, at least one parameter indicative of the transmit chain links, and further configured to repeatedly measure a phase difference of the received at least two signals over a predetermined time interval and to determine a slope of measured phase differences when represented versus a frequency corresponding to the at least two signals, and configured to assign to the at least one parameter a value of the determined slope; and
the processor being configured to collect the at least one parameter in a measurement report and transmit the measurement report to the antenna to be transmitted from the receiving unit for correcting, based on the at least one parameter, the at least one impairment related to the transmit chain links.

13. The receiving unit of claim 12, wherein the transmit chain links extend between parts of the transmitting unit and corresponding antennas of the transmitting unit.

14. The receiving unit of claim 12, wherein the antenna is configured to receive the at least two signals from two different antennas of the transmitting unit and the measurement report is transmitted to the transmitting unit.

15. The receiving unit of claim 12, wherein the at least one impairment is one of a time misalignment, filter coefficients, and phase uncertainty.

16. The receiving unit of claim 12, wherein the transmitting unit is part of a base station.

17. A device for calibrating at least one impairment based on at least one measurement report received from a receiving unit, the receiving unit and the device being connected to a radio telecommunication network, the network including one or more user equipment units connected to one or more radio base stations, the user equipment units and radio base stations including the receiving unit and the device, the device comprising:
an antenna array configured to send at least two calibrating signals substantially simultaneously to the receiving unit via two different transmit chain links, wherein each transmitting chain link includes at least a separate antenna and transmits a respective one of the two calibrating signals, and to receive the at least one measurement report from the receiving unit, the measurement report including at least one parameter having a value assigned by the receiving unit to be a slope of measured phase differences of the at least two signals when represented versus a frequency; and
a control unit connected to the antenna array and configured to correct, based on the received at least one parameter, the at least one impairment related to the transmit chain links.

18. The device of claim 17, wherein the control unit is further configured to correct the at least one impairment based on plural values of the at least one parameter received in plural measurement reports received from plural receiving units.

* * * * *

UNITED STATES PATENT AND TRADEMARK OFFICE
CERTIFICATE OF CORRECTION

PATENT NO. : 8,401,485 B2
APPLICATION NO. : 12/522794
DATED : March 19, 2013
INVENTOR(S) : Jöngren et al.

Page 1 of 1

It is certified that error appears in the above-identified patent and that said Letters Patent is hereby corrected as shown below:

In the Specification

In Column 1, Line 56, delete "(i.e." and insert - - (i.e., - -, therefor.

In Column 2, Line 4, delete "configuration." and insert - - configuration, - -, therefor.

In Column 4, Line 58, delete "includes;" and insert - - includes: - -, therefor.

In Column 6, Line 30, delete "channel:" and insert - - channel; - -, therefor.

In Column 6, Line 32, delete "carrier:" and insert - - carrier; - -, therefor.

In Column 6, Line 34, delete "configuration:" and insert - - configuration; - -, therefor.

In Column 6, Line 42, delete "graph:" and insert - - graph; - -, therefor.

In Column 6, Line 44, delete "station:" and insert - - station; - -, therefor.

In Column 8, Line 61, delete "(hut" and insert - - (but - -, therefor.

Signed and Sealed this
Sixth Day of August, 2013

Teresa Stanek Rea
*Acting Director of the United States Patent and Trademark Office*